(12) United States Patent
White et al.

(10) Patent No.: US 11,679,881 B2
(45) Date of Patent: Jun. 20, 2023

(54) ARRANGEMENT OF INDIVIDUAL SEATS FOR PASSENGERS OF AN AEROPLANE

(71) Applicant: Safran Seats, Plaisir (FR)

(72) Inventors: Jeremy White, Middlesex (GB); Nicholas Sandham, London (GB); Richard Seale, Warwickshire (GB); Omar Chraibi, London (GB)

(73) Assignee: Safran Seats, Plaisir (FR)

(*) Notice: Subject to any disclaimer, the term of this patent is extended or adjusted under 35 U.S.C. 154(b) by 24 days.

(21) Appl. No.: 16/469,827

(22) PCT Filed: Dec. 14, 2017

(86) PCT No.: PCT/EP2017/082768
§ 371 (c)(1),
(2) Date: Jun. 14, 2019

(87) PCT Pub. No.: WO2018/109066
PCT Pub. Date: Jun. 21, 2018

(65) Prior Publication Data
US 2019/0315468 A1    Oct. 17, 2019

(30) Foreign Application Priority Data
Dec. 14, 2016  (FR) ...................................... 1670759

(51) Int. Cl.
*B64D 11/06*    (2006.01)
(52) U.S. Cl.
CPC ...... *B64D 11/0605* (2014.12); *B64D 11/0601* (2014.12); *B64D 11/0604* (2014.12); *B64D 11/0606* (2014.12); *B64D 11/0641* (2014.12)
(58) Field of Classification Search
CPC ............ B64D 11/0601; B64D 11/0602; B64D 11/0604; B64D 11/0605; B64D 11/0606; B64D 11/0641; B64D 11/0646
See application file for complete search history.

(56) References Cited

U.S. PATENT DOCUMENTS 4,035,014 A * 7/1977 Sellers .................... B60R 21/12
                                                        296/24.46
7,296,774 B2 * 11/2007 Oh ......................... F16M 11/08
                                                        248/324
(Continued)

FOREIGN PATENT DOCUMENTS

FR      2920011 A1    2/2009
JP    2001253283 A    9/2001
(Continued)

OTHER PUBLICATIONS

International Patent Application No. PCT/EP2017/082768, International Search Report (including English translation) and Written Opinion, dated Feb. 20, 2018.
International Patent Application No. PCT/EP2017/082768, English Translation of Written Opinion of the International Searching Authority, dated May 1, 2019.
(Continued)

*Primary Examiner* — Richard Green
*Assistant Examiner* — Madison Elizabeth Dittner
(74) *Attorney, Agent, or Firm* — Kilpatrick Townsend & Stockton LLP

(57) ABSTRACT

An arrangement of individual seats for installation in an aeroplane cabin having a first set of two seats and a second set of two seats, each seat having an axis and being convertible between a sitting position and an extended position, said arrangement having a longitudinal axis. The arrangement also includes (i) a first central console having a first foot area and a second foot area open in two opposite directions relative to each other and respectively associated with the first seat of the first set and the first seat of the second set and (ii) a second central console having a first foot area and a second foot area open in two opposite directions relative to each other and respectively associated with the second seat of the first set and the second seat of the second set.

20 Claims, 13 Drawing Sheets

(56) References Cited

U.S. PATENT DOCUMENTS

| | | | |
|---|---|---|---|
| 7,419,214 B2* | 9/2008 | Plant | B64D 11/0606 297/245 |
| 7,934,679 B2* | 5/2011 | Bock | B64D 11/0605 244/118.6 |
| 8,348,195 B2* | 1/2013 | Ersan | B64D 11/06 244/118.6 |
| 9,266,614 B2* | 2/2016 | Henshaw | B64D 11/0605 |
| 9,446,848 B2* | 9/2016 | Jerome | B64D 11/0641 |
| 9,527,592 B2* | 12/2016 | Ducreux | B64D 11/0604 |
| 9,545,999 B2* | 1/2017 | Henshaw | B64D 11/0641 |
| 10,131,432 B2* | 11/2018 | Simeon | B64D 11/0601 |
| 10,315,772 B2* | 6/2019 | Ehrmann | B60N 2/34 |
| 2007/0246981 A1 | 10/2007 | Plant | |
| 2009/0050740 A1 | 2/2009 | Saint-Jaimes et al. | |
| 2012/0298798 A1 | 11/2012 | Henshaw et al. | |
| 2013/0241247 A1 | 9/2013 | Wallace et al. | |
| 2014/0361585 A1 | 12/2014 | Henshaw | |
| 2015/0210393 A1* | 7/2015 | Savian | B64D 11/0015 244/118.6 |
| 2016/0297530 A1 | 10/2016 | Simeon et al. | |

FOREIGN PATENT DOCUMENTS

| | | | |
|---|---|---|---|
| JP | 2004537459 A | 12/2004 | |
| JP | 2009534248 A | 9/2009 | |
| JP | 2015511557 A | 4/2015 | |
| WO | 2003013903 A1 | 2/2003 | |
| WO | 2007124398 A2 | 11/2007 | |
| WO | 2013138442 A1 | 9/2013 | |
| WO | 2015061688 A2 | 4/2015 | |
| WO | WO-2015061688 A2 * | 4/2015 | B64D 11/0601 |
| WO | 2016164564 A1 | 10/2016 | |

OTHER PUBLICATIONS

Japan Patent Application No. 2019531810, Office Action (Notice of Reasons for Refusal), dated Nov. 2, 2021.

Japan Patent Application No. 2019531810, Written Opinion, dated Jan. 31, 2022.

Japan Patent Application No. 2019531810, Decision to Grant a Patent, dated Mar. 8, 2022.

* cited by examiner ized by the seatback
ARRANGEMENT OF INDIVIDUAL SEATS FOR PASSENGERS OF AN AEROPLANE The present invention relates to an arrangement of individual seats for passengers of an aeroplane.

The "Business Class" type of aeroplane seats offer passengers different comfort positions, from a "sitting" position to an "extended" position in which the seat creates a substantially horizontal lying surface for the passenger.

Intermediate positions of comfort are also proposed, such as the "relax" position in which the back is strongly reclined. Generally, these positions are obtained by the seatback angle, which pivots around a horizontal axis and perpendicular to the axis of the seat. The passenger can then remain on the seat during transitions between different positions.

The bed generally consists of the seatback, the seat, a leg rest and a foot rest; the latter can be fixed or related to the seat kinematics.

Certain "Business Class" aeroplane cabin seating arrangements allow direct access to a traffic lane for all passengers via an aisle arranged between two seats which are arranged one behind the other in the longitudinal direction of the passenger plane. Passengers can thus easily get out of their seat, especially when the seat is in the "reclined" position without disturbing other passengers.

In some configurations, the seats are arranged along two longitudinal columns and the seats of the same row have inclined axes, i.e., that they form a non-zero angle with respect to the longitudinal axis of the arrangement.

Document US2007246981 describes a chevron configuration, termed a "herringbone" configuration in English, in which the seats of the same row are turned inwardly towards the longitudinal axis of the arrangement, i.e. that their axes intersect the longitudinal axis of the aeroplane at the front of the seats.

In the "reverse herringbone" configuration described in document WO03/013903, the seats of one row are turned outwardly from the longitudinal axis, i.e., the axes intersect the longitudinal axis of the aeroplane at the rear of the seats. Passengers are thus oriented towards the aisle of the cabin.

The invention aims to improve the modularity of existing configurations by providing an arrangement of individual seats intended to be installed in an aeroplane cabin comprising a first set of two seats and a second set of two seats, each seat having an axis and being convertible between a sitting position and an extended position, said arrangement having a longitudinal axis, characterized in that:

a first seat of the first set is positioned facing a first seat of the second set, a second seat of the first set is positioned facing a second seat of the second set, the first seat and second seat of the first set are facing inwardly towards the longitudinal axis of the arrangement, the first seat and the second seat of the second set are facing outwardly from the longitudinal axis of the arrangement, and in which the arrangement further comprises:

a first central console and a second central console positioned between the first set of seats and the second set of seats, the first central console comprising a first foot area and a second foot area open in two opposite directions relative to each other and associated respectively with the first seat of the first set and the first seat of the second set, the second central console comprising a first foot area and a second open foot area in two opposite directions with respect to each other and associated, respectively, with the second seat of the first set and the second seat of the second set.

The invention thus makes it possible to offer passengers a variety of positions in the aeroplane cabin while having a high degree of modularity in the configuration of the seating arrangement.

According to one embodiment, in each central console the foot areas are superimposed at least partially along the longitudinal axis of the arrangement.

According to one embodiment, the said arrangement comprises a central partition extending along the longitudinal axis to separate the seats of a set. Such a configuration makes it possible to create two modules of seats facing each other.

In one embodiment, the central partition is retractable between an extended position and a stowed position.

In one embodiment, in the stowed position, the central partition is housed at least partially in a space between the two central consoles.

In one embodiment, the central partition is constructed in a single part.

In one embodiment, the central partition is constructed in two parts to isolate the side by side seats of the two sets of seats.

In one embodiment, said central partition is mechanically connected to masts of the arrangement.

According to one embodiment, the said arrangement further comprises a transverse partition extending in a direction perpendicular to the longitudinal axis of said arrangements for isolating the first set of seats relative to the second set of seats.

According to one embodiment, the transverse partition is constructed in two retractable parts between an extended position and a stowed position, said two parts allowing the first seats of each set or the second seats of each set to be separated independently.

According to one embodiment, in the stowed position, each part of the transverse partition is housed at least partially in a space in a corresponding central console.

In one embodiment, the transverse partition carries screens each of which is associated with a seat of said arrangement.

According to one embodiment, said arrangement further comprises at least one support carrying a screen, said support being rotatably mounted relative to a mast and said screen being rotatably mounted relative to said support.

According to one embodiment, said arrangement comprises at least one lateral partition extending along an aisle, said lateral partition including a means for closing a passage between the seat and the corresponding central console.

In one embodiment, the lateral partition is supported by masts.

In one embodiment, the masts are hollow to allow the passage of wiring harnesses carrying power and data signals for multimedia systems associated with the seats.

In one embodiment, each seat is associated with a hull positioned around the seat backs.

The invention also relates to an aeroplane cabin comprising:

a central group of seats and two lateral groups of seats located on either side of the central group of seats, each lateral group of seats being separated from the central group by an aisle, characterized in that the central group comprises at least one arrangement of four seats as previously defined.

In one embodiment, at least one arrangement of four seats is located at one end of the central group of seats.

Such a configuration saves space in the cabin by avoiding having to implement a module integrating the foot areas at one end of the central group.

According to one embodiment, the lateral groups are formed in particular by a repetition of modules of two seats associated with a central console.

Of course, the various features, variations and/or embodiments of the present invention may be associated with each other in various combinations to the extent that they are not incompatible or mutually exclusive.

The present invention will be better understood and other characteristics and advantages will become apparent upon reading the following detailed description comprising the embodiments given for illustrative purposes with reference to the appended figures, which are presented including non-exhaustive examples, which may be used to complete the understanding of the present invention and the presentation of its realization and, where appropriate, to contribute to its definition, in which.

Figure 1A:
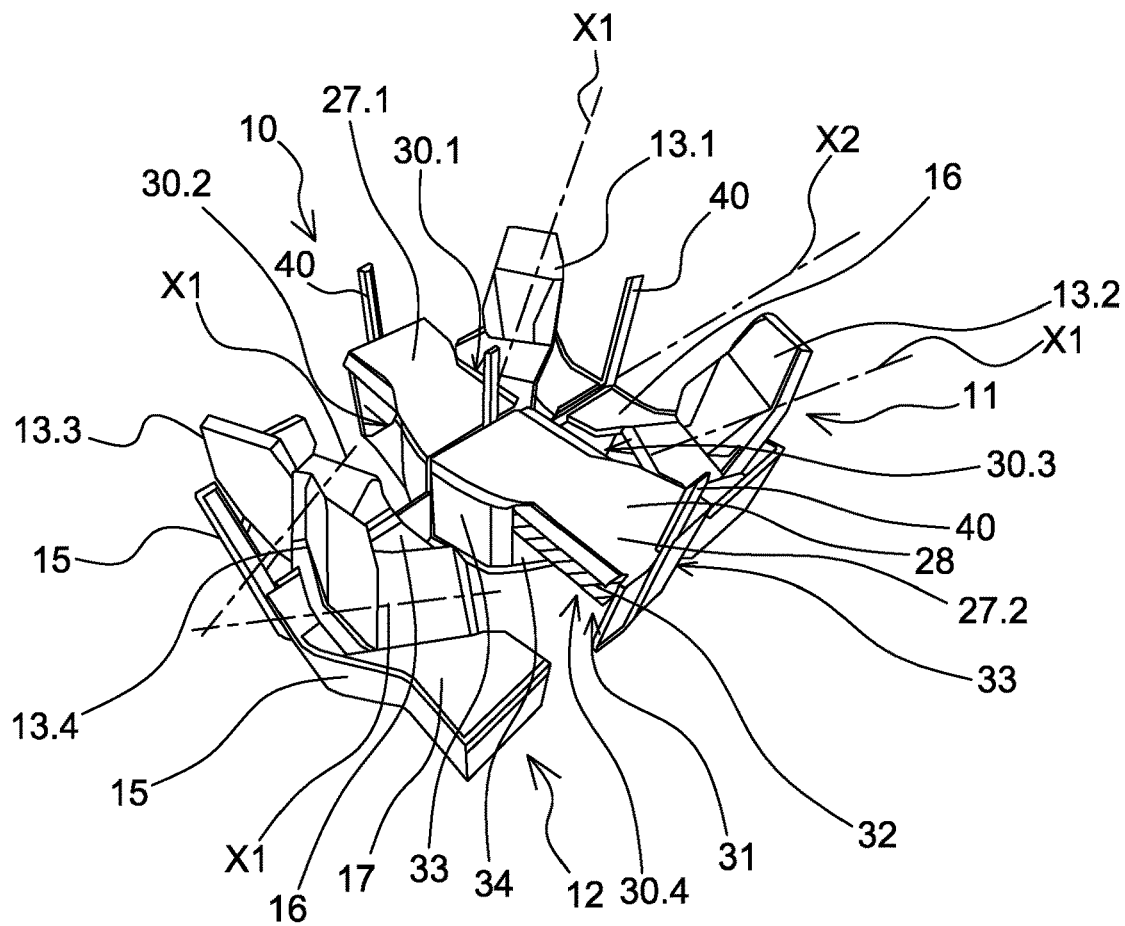
FIGS. 1a to 1d are perspective views illustrating a first embodiment of the arrangement of seats according to the invention termed the "cinema mode"

It should be noted that, in the figures, the structural and/or functional elements common to the various embodiments may have the same references. Thus, unless otherwise stated, such elements have identical structural, dimensional and material properties.

FIGS. 1a to 1d and 3a to 3g show an arrangement 10 of the individual seats for installation in an aeroplane cabin. This arrangement 10 comprises a first set 11 of two seats 13.1, 13.2 and a second set 12 of two seats 13.3, 13.4. In each set 11, 12, the seats (13.1 and 13.2 for the assembly 11, and 13.3 and 13.4 for the assembly 12) are located side by side.

Each seat 13.1-13.4 has an axis X1 corresponding to the intersection between a horizontal plane and a seat plane of symmetry. Each seat 13.1-13.4 is preferably convertible between a "sitting" position corresponding to the position used, in particular, during the stopping, taking off, and landing phases of the aeroplane, and an "extended" position in which the seat 13.1-13.4 defines a substantially horizontal lying surface for the passenger. Each seat 13.1-13.4 may also take intermediate positions, termed relax positions, between these two extreme positions.

The arrangement 10 has a longitudinal axis X2 which may extend along the axis X3 of the aeroplane cabin (see FIGS. 5a to 5j) or be parallel to this axis X3. Alternatively, the axis X2 may be substantially perpendicular or form any angle with respect to the axis X3 of the cabin. The longitudinal axis X2 passes between the seats 13.1 and 13.2 (respectively 13.3 and 13.4) of the same set 11 (respectively 12). This axis X2 can be located in a plane of symmetry of the arrangement 10.

More precisely, a first seat 13.1 of the first set 11 is positioned opposite a first seat 13.3 of the second set 12 and a second seat 13.2 of the first set 11 is positioned opposite a second seat 13.4 of the second set 12.

In addition, the first seat 13.1 and the second seat 13.2 of the first set 11 are turned inwardly towards the longitudinal axis X2 of the arrangement 10. The first seat 13.3 and the second seat 13.4 of the second set 12 are turned outwardly facing the longitudinal axis X 2 of the arrangement 10.

Preferably, the axes X1 of the seats 13.1, 13.2, 13.3, 13.4 form substantially the same angle in relation to the longitudinal axis X2 of the arrangement 10. The axes X1 of the seats of the same set 11, 12 intersect the longitudinal axis X2 of the arrangement 10 at substantially a single point.

Thus, the axes X1 of the seats 13.1, 13.2 of the first set 11 intersect the longitudinal axis X2 at the front of the seats 13.1, 13.2 substantially at one point; while the axes X1 of the seats 13.3, 13.4 of the second set 12 intersect the longitudinal axis X2 behind the seats 13.3, 13.4 substantially at one point.

Alternatively, the X1 axes of the seats of the same set 11, 12 may be offset relative to each other along the longitudinal axis X2, so that the axes of the seats of the same set 11, 12 intersect the longitudinal axis X2 at different points.

Each seat 13.1, 13.2, 13.3, 13.4 is integrated into a corresponding housing of a base module 15. This base module 15 comprises an armrest 16 located on one side of the seat 13.1-13.4 and a cushion 17 located on the other side of the seat 13.1-13.4. The cushion 17 is preferably a cushion for maximizing the coating intended to be positioned in the extension of the lying plane of the seat 13.1-13.4 when it is in the extended position. The armrest 16 may be a retractable armrest between a raised position allowing the passenger to rest their elbows when the corresponding seat 13.1-13.4 is in a seated position and a lowered position in which the armrest 16 is located in the extension of the seat 13.1-13.4 in the extended position.

Figure 1B:
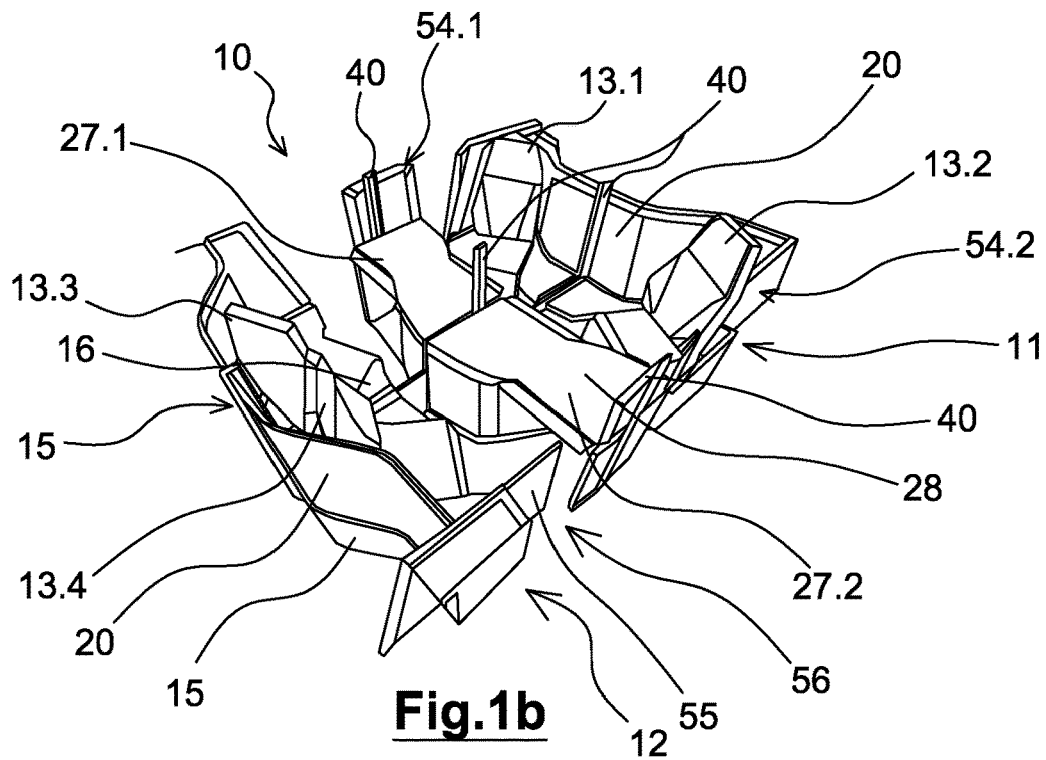

Each seat 13.1-13.4 is also associated with a hull 20, visible in particular in FIG. 1b, positioned around its seatback to isolate the seat 13.1-13.4 of a neighboring arrangement 10. The hulls 20 of the seats 13.1 and 13.2 (respectively 13.3 and 13.4) of the same set 11 (respectively 12) can be constructed in one piece.

Figure 2:
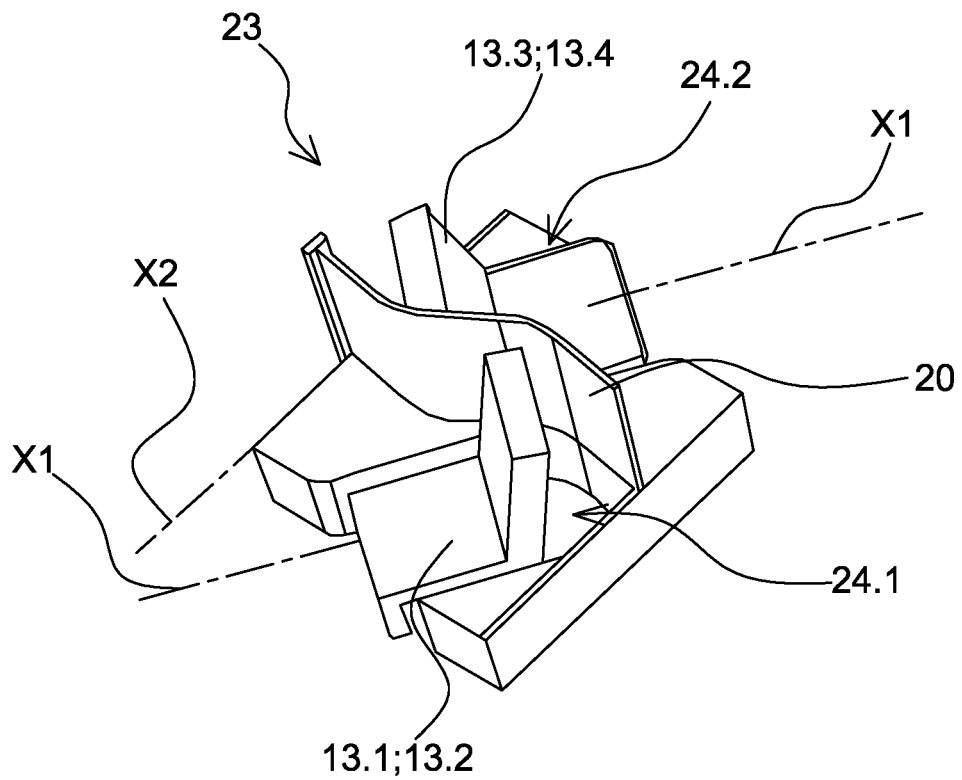
FIG. 2 is a perspective view of a dual module that may be used to provide a plurality of back-to-back seating arrangements according to the present invention.

In the case where several arrangements 10 are positioned one behind the other, the seat 13.1 (respectively 13.2) of the first set 11 and the adjacent seat 13.3 (respectively 13.4) of the second set 12 positioned along the same longitudinal column can be obtained from a double module 23. As illustrated in FIG. 2, the double module 23 comprises two housings 24.1, 24.2 for receiving the seats 13.1 and 13.3 (respectively 13.2 and 13.4) so that the seats 13.1 and 13.3 (respectively 13.2 and 13.4) are rotated in two opposite directions with respect to each other. One of the seats 13.1 (respectively 13.2) is turned towards the longitudinal axis X2, while the other seat 13.3 (respectively 13.4) is turned outwardly towards the longitudinal axis X2. The axes X1 of the two seats 13.1 and 13.3 (respectively 13.2 and 13.4) installed on the same module 28 are preferably substantially parallel to each other. A hull 20 extends between the two seats 13.1 and 13.3 (respectively 13.2 and 13.4) of the double module 23. In addition, in the double module 23 the seat backs 13.1 and 13.3 (respectively 13.2 and 13.4) in the extended position overlap at least partially in the longitudinal direction Y.

Furthermore, the arrangement 10 includes a first central console 27.1 and a second central console 27.2 positioned between the first set of seats 11 and the second set of seats 12. The central consoles 27.1, 27.2 each have a flat upper face 28 on which the passenger can, in particular, place objects.

The first central console 27.1 has a first foot area 30.1 and a second foot area 30.2 open in two opposite directions relative to each other and respectively associated with the first seat 13.1 of the first set 11 and the first seat 13.3 of the second set 12. Thus, the foot area 30.1 is located in the extension of the first seat 13.1 of the first set 11 when the latter is in the extended position. The opposite foot area 30.2 is located in the extension of the first seat 13.3 of the second set 12 when the latter is in the extended position.

Similarly, the second central console 27.2 has a first foot area 30.3 and a second foot rest area 30.4 open in two opposite directions relative to each other and respectively associated with the second seat 13.2 of the first set 11 and the second seat 13.4 of the second set 12. Thus, the foot area 30.3 is located in the extension of the second seat 13.2 of the first set 11 when the latter is in the extended position. The opposite foot area 30.4 is in the extension of the second seat 13.4 of the second set 12 when the latter is in the extended position.

In each central console 27.1, 27.2, the foot areas 30.1 and 30.2 (respectively 30.3 and 30.4) are superimposed at least partially along the longitudinal axis X2. Thus, there is at least one straight line perpendicular to the longitudinal axis X2 which intersects the two-foot areas 30.1 and 30.2 (respectively 30.3 and 30.4) of the same central console 27.1 (respectively 27.2). More specifically, the feet 30.1-30.4 areas consist of housings 31 open towards the corresponding seat 13.1-13.4 and a cushion 32 of substantially horizontal foot rest located inside the housing 31, on which the passenger can rest their feet, as shown in FIG. 1a.

The housings 31 constructed in a central console 27.1, 27.2 are each delimited by a bottom 33, the bottom 33 of the two housings 31 formed in the same consoles 27.1, 27.2 being interconnected by a common partition 34 inclined relative to the longitudinal axis X2.

In order to have a modular character, the central consoles 27.1, 27.2 are advantageously independent of one another. As a variant, the consoles 27.1, 27.2 may, however, be constructed in one piece so as to form a single piece.

Figure 1C:
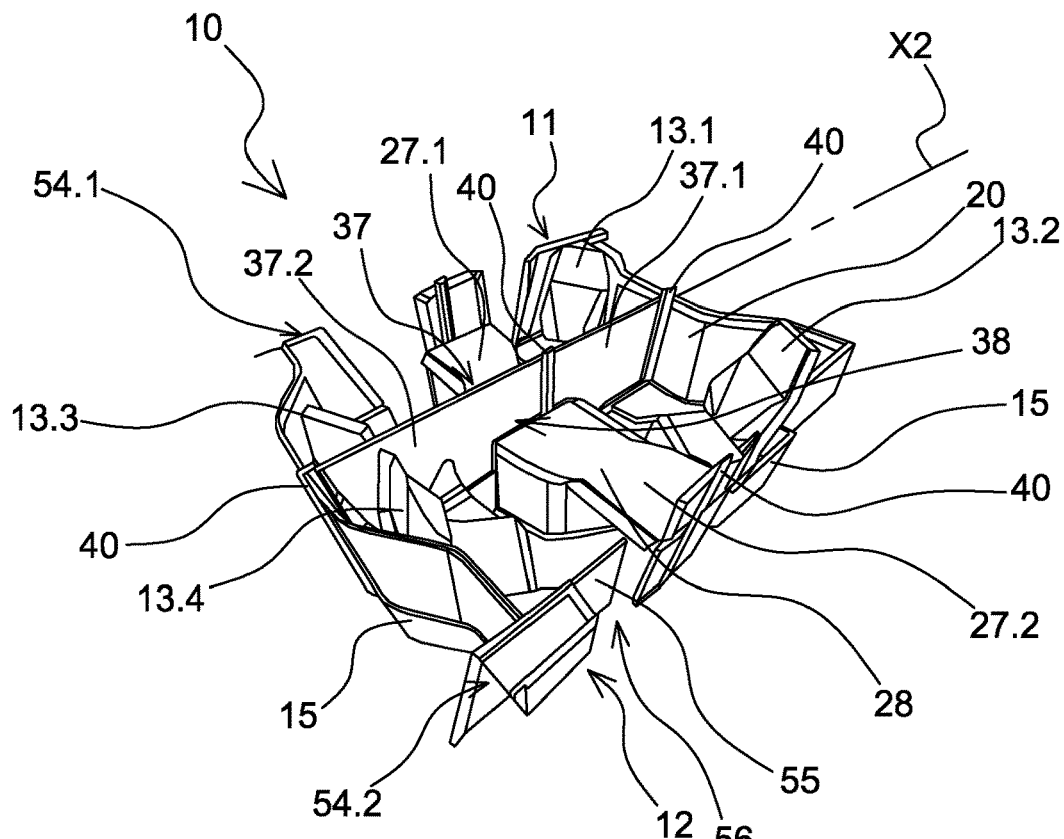
Figure 5A:
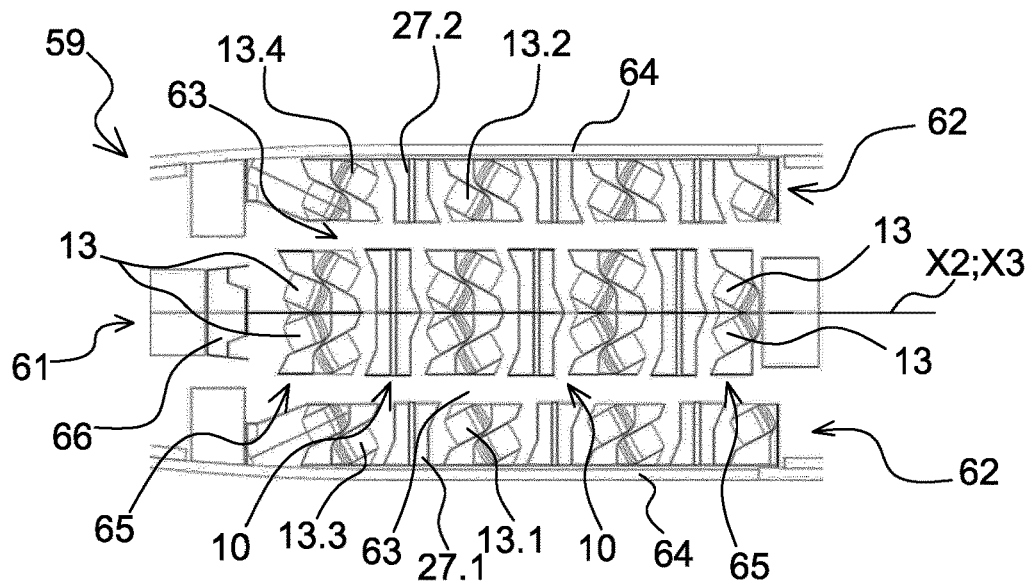
FIGS. 5a to 5j illustrate different configurations of the aeroplane cabin according to the invention having different numbers of places.
Figure 5B:
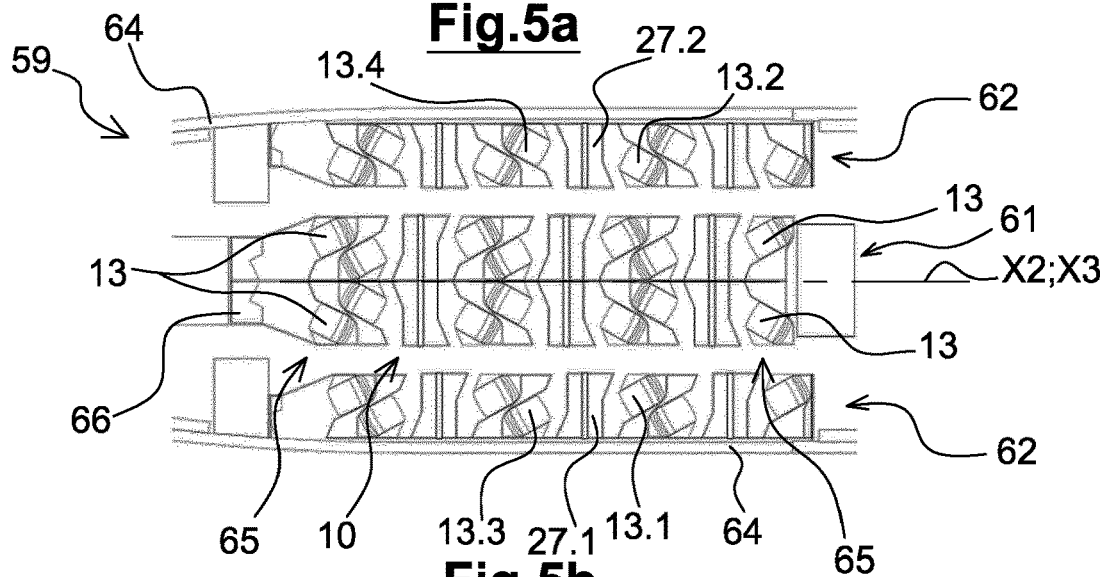

Moreover, a central partition 37 extends along the longitudinal axis X2 to separate the seats 13.1, 13.2 (respectively 13.3 and 13.4) of the assembly 11, 12. As illustrated in FIG. 1c, such a configuration makes it possible to create two facing seat modules, namely a first module formed by the seats 13.1 and 13.3, and a second module formed by the seats 13.2 and 13.4. As explained in more detail below, these facing seat modules can be repeated in the lateral groups 62 of seats in the aeroplane cabin, as illustrated by FIGS. 5a and 5b, in particular.

Figure 3A:
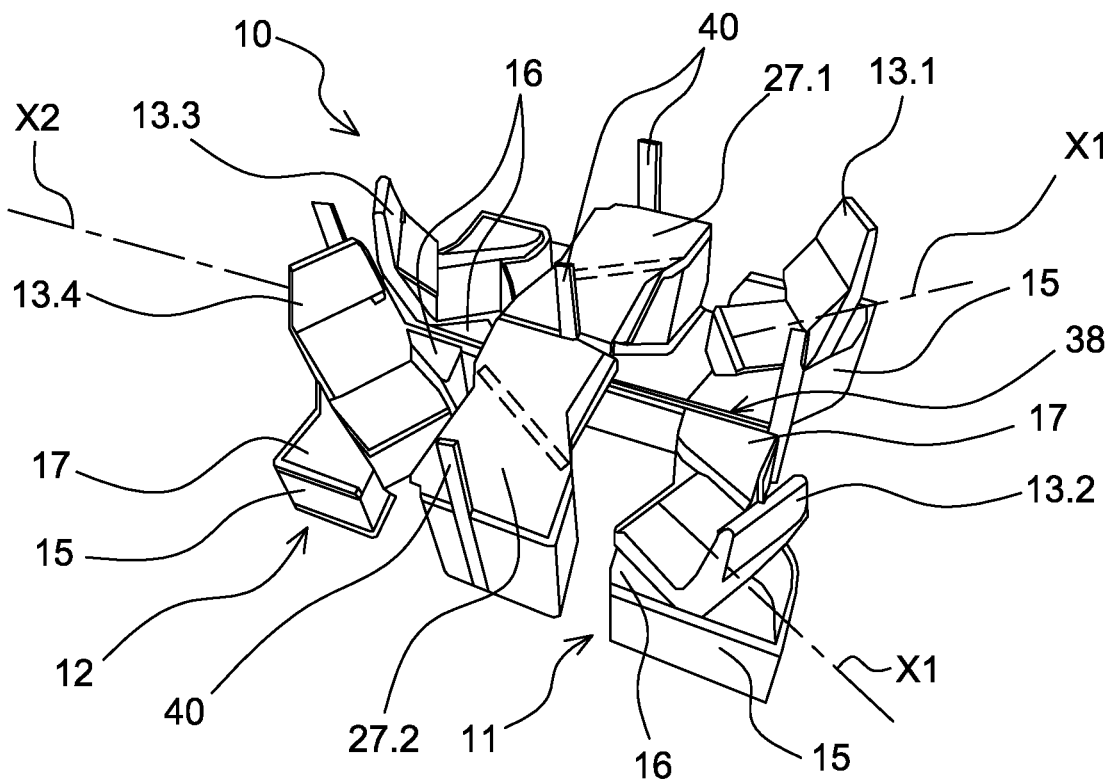
FIGS. 3a to 3g are perspective views illustrating a second embodiment of the arrangement of seats according to the invention termed the "office mode"
Figure 3B:
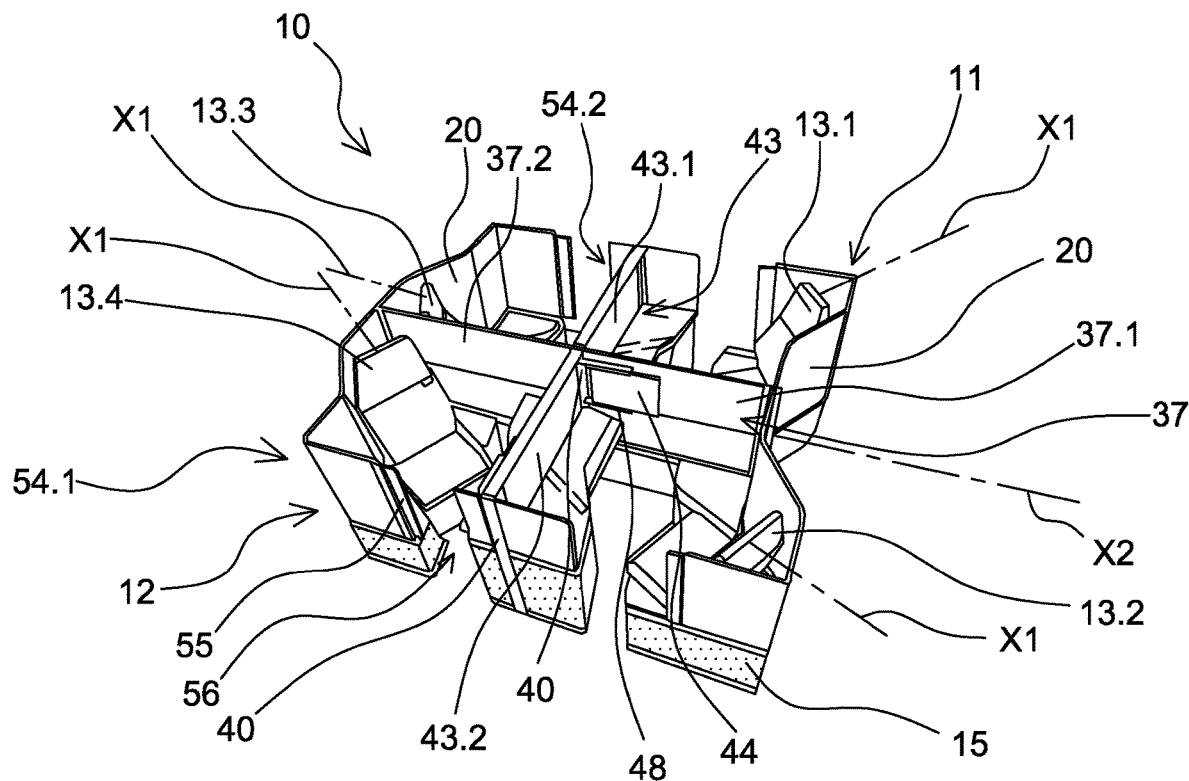

The central partition 37 is advantageously retractable between an extended position and a stowed position. In the stowed position, said central partition 37 is housed at least partially in a space 38 between the two central consoles 27.1, 27.2, as shown in FIG. 3d.

The central partition 37 is constructed in one or two parts 37.1, 37.2 to independently isolate the seats 13.1 and 13.2 (respectively 13.3 and 13.4) at the side of of the two sets of seats 11, 12.

In a particular embodiment, the central partition 37 is mechanically connected to the masts 40. In fact, the arrangement 10 comprise vertically extending hollow masts 40 to allow the passage of wiring harnesses carrying power and data signals for multimedia systems associated with seats 13.1-13.4. It will thus be possible to take advantage of the presence of these masts 40 and to use them as supports for fixing the central partition 37 and the other partitions of the arrangement 10, as explained below.

For this purpose, the masts 40 carrying the central partition 37 may include slides to allow a displacement of each part 37.1, 37.2 of the partition 37 in a vertical direction in order to move from one position to another. Alternatively, the displacement of the central partition 37 may be a lateral displacement or a rotation or a combination of these displacements.

Furthermore, the transverse partition 43 extends in a direction perpendicular to the longitudinal axis X2 of the arrangement 10 to separate the two sets of seats 11 and 12.

Figure 1D:
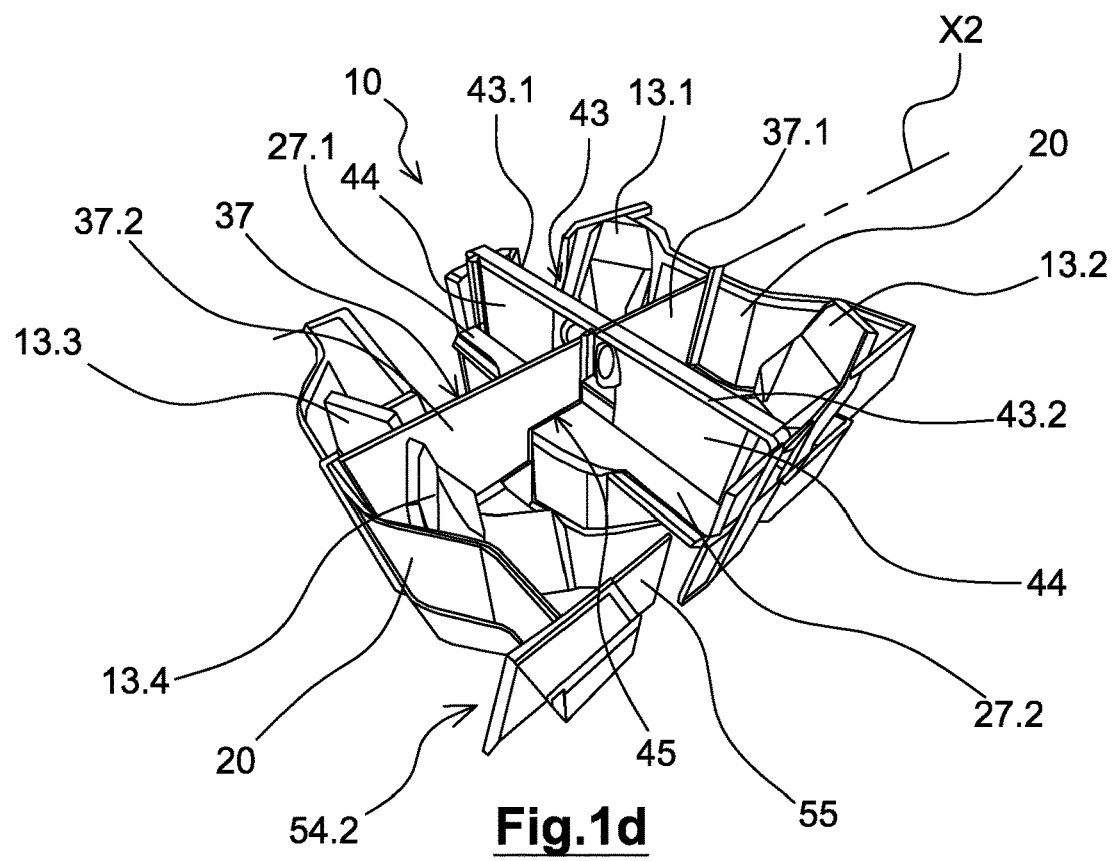

In the embodiment of FIG. 1d, the transverse partition 43 carries screens 44 which are each associated with a seat 13.1-13.4 of the arrangement 10. The transverse partition 43 thus carries two screens 44 on each of its faces. As before, the masts 40 may serve as a support structure for the transverse partition 43. In certain configurations, the transverse partition 43 may comprise forms for covering and concealing the masts 40.

The transverse partition 43 is preferably constructed in two parts 43.1, 43.2 which may be retractable between an extended position corresponding to the position shown in FIG. 3d and a stowed position.

Figure 3C:
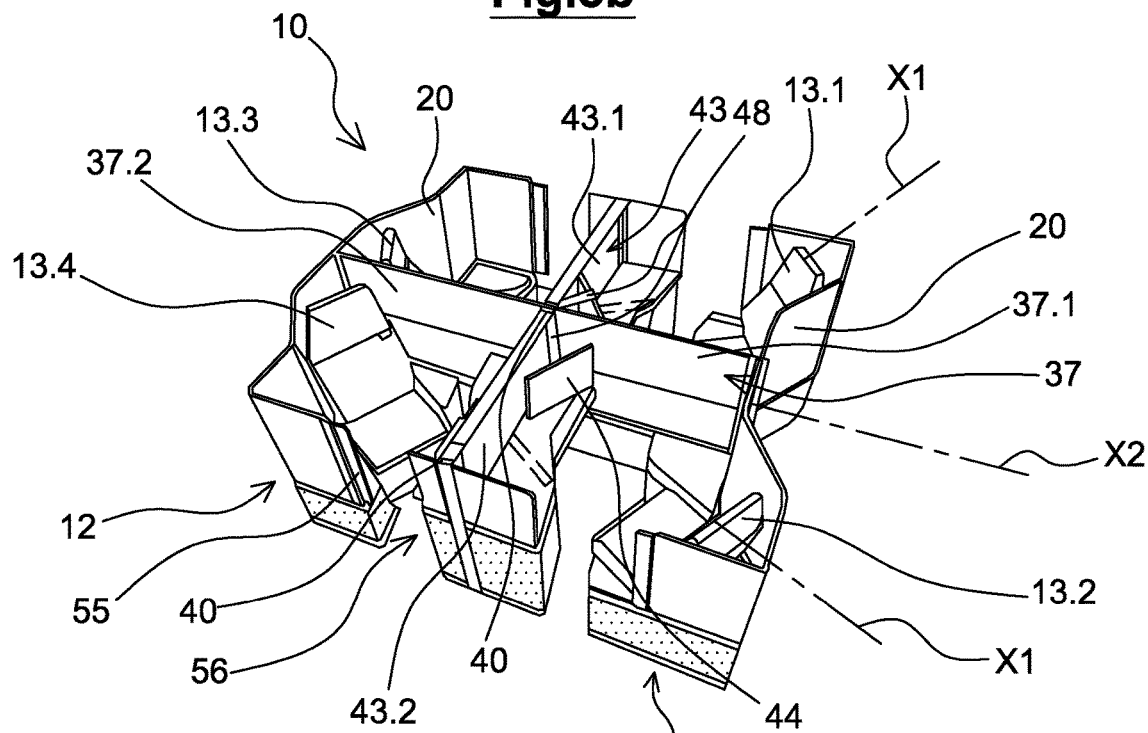
Figure 3D:
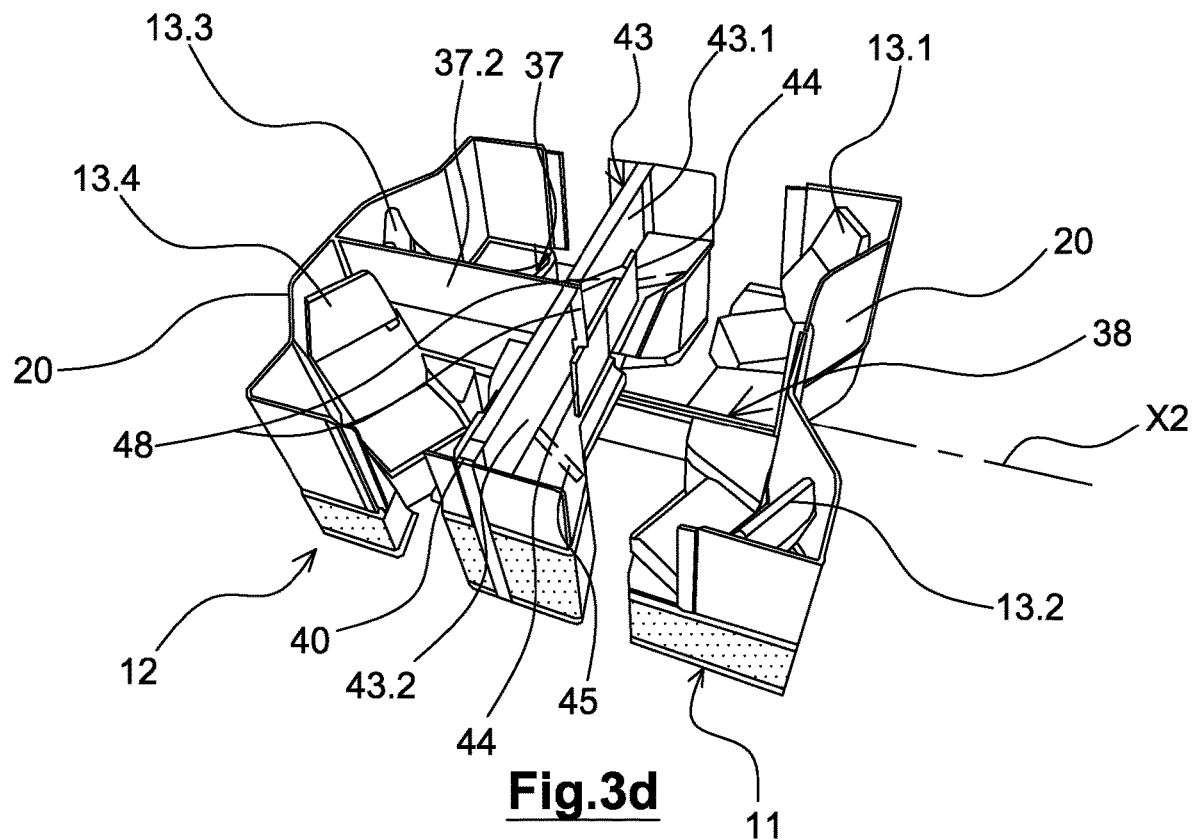
Figure 3E:
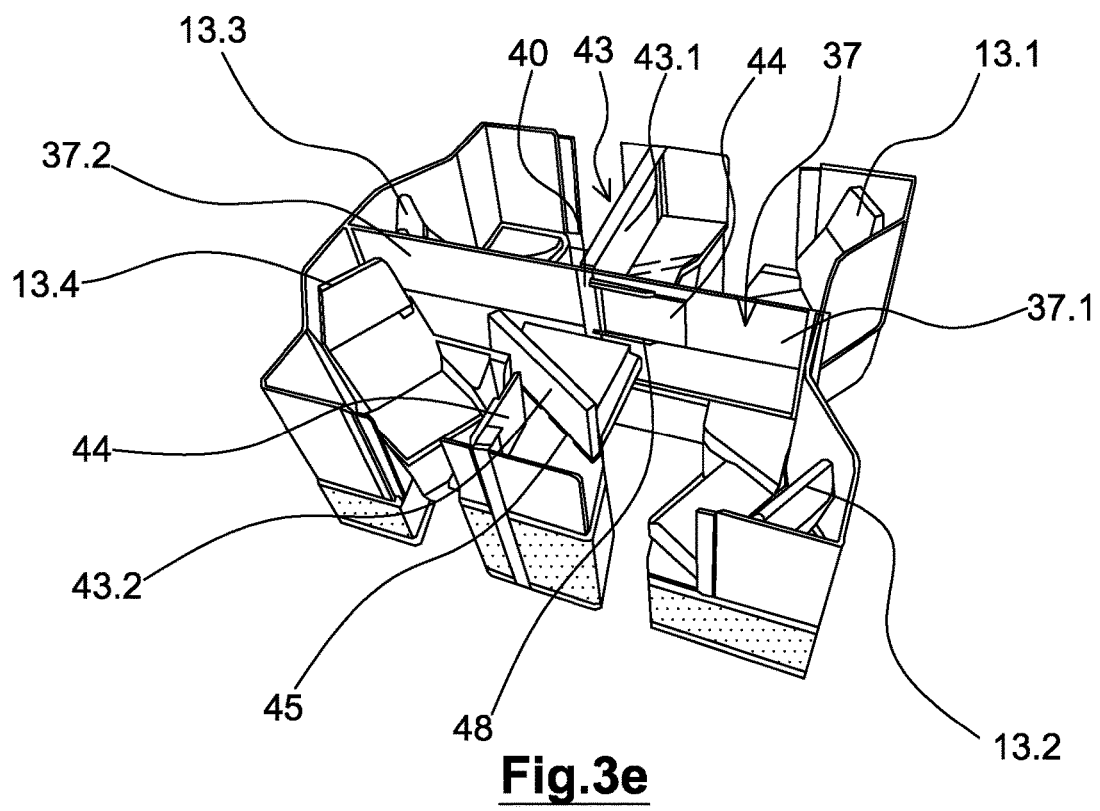
Figure 3F:
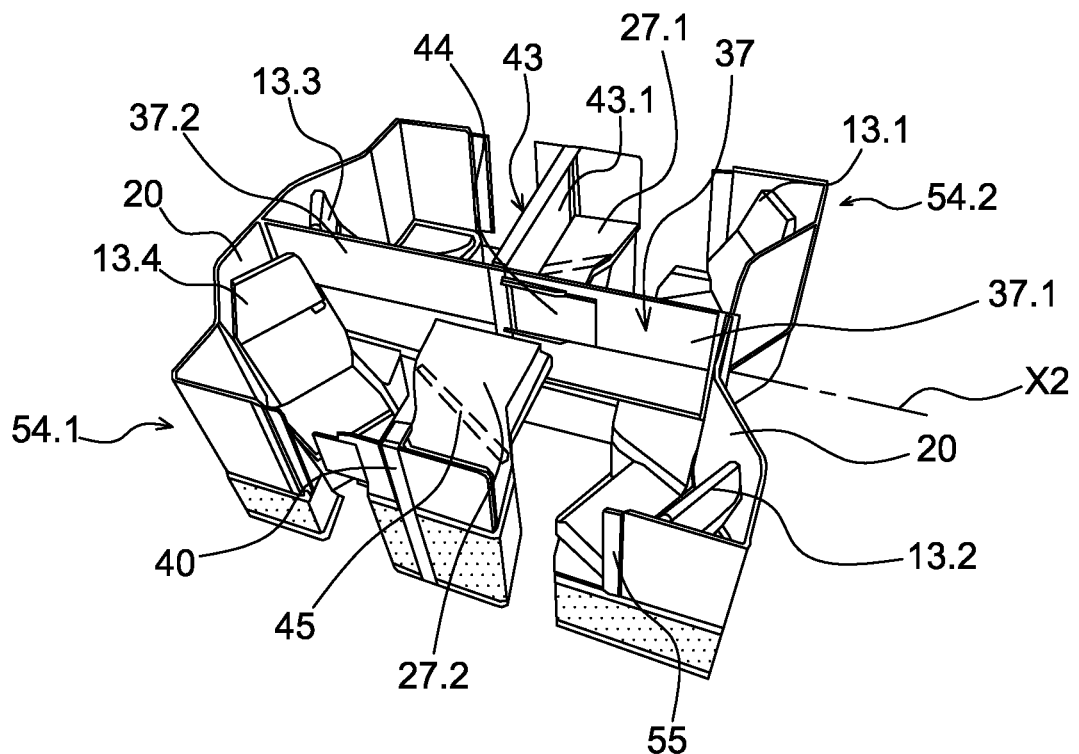

As shown in FIG. 3f, in the stowed position, each part 43.1, 43.2 of the transverse partition 43 is housed at least partially in a space 45 formed in the corresponding central console 27.1, 27.2. In order to move from one position to the other, each part 43.1, 43.2 of the partition 43 is rotatable along a vertical axis and is slidable along this axis.

In fact, the space 45 receiving a corresponding part being inclined relative to the direction of extension of the transverse partition 43 in the deployed position, it is first necessary to rotate it about a vertical axis to align the part 43.1, 43.2 of the partition 43 with the corresponding storage space 45, as shown in FIG. 3e, then pushing the part 43.1, 43.2 downwardly in the vertical direction to make it enter the storage space 45, as shown in FIG. 3f.

In the case where the length of the storage space 45 is less than that of the part 43.1, 43.2 of the corresponding partition 43 when the latter is in the deployed position, it will be possible to use a telescopic transverse partition 43.

As is illustrated in FIGS. 4a to 4f, arrangement 10 provides a high degree of modularity to allow the provision of multiple comfortable amenities for passengers.

Figure 4A:
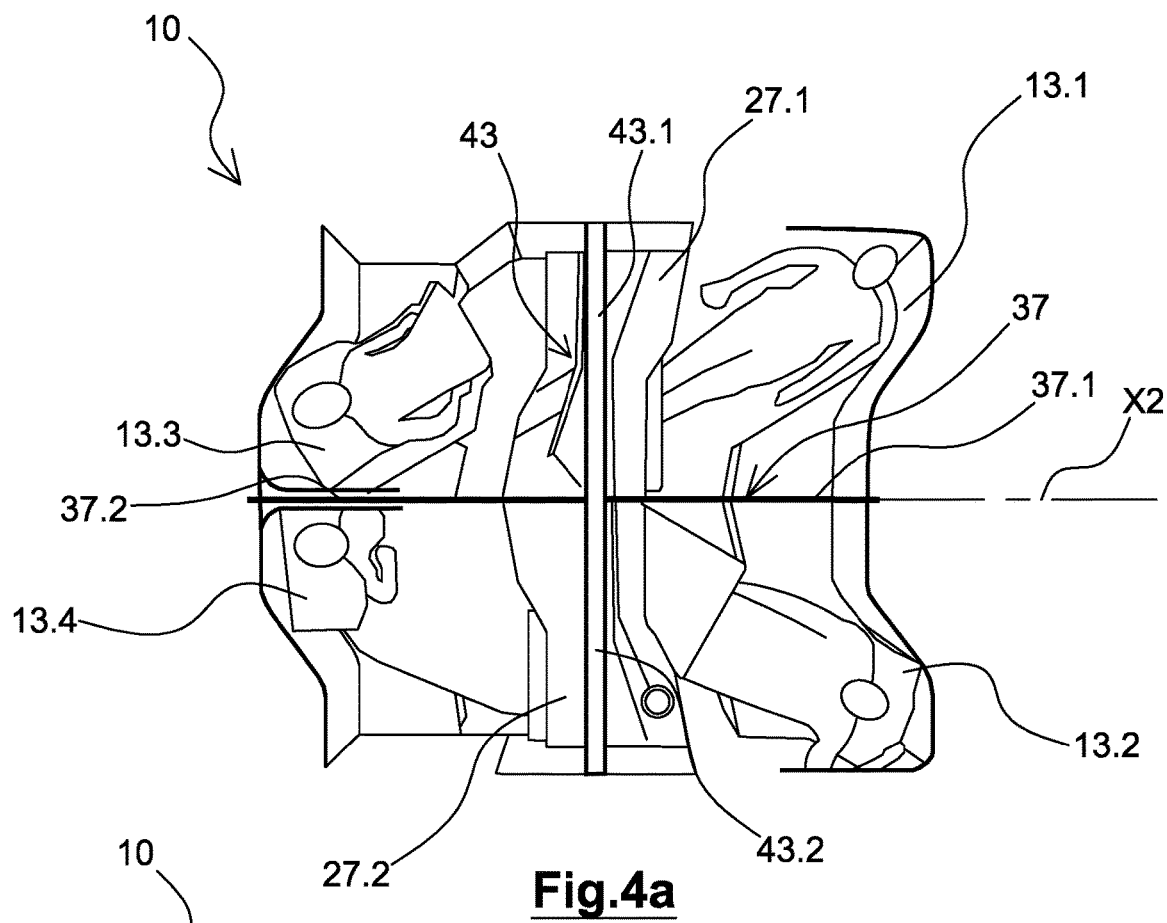
FIGS. 4a to 4f are top views illustrating different configurations of the arrangement according to the invention which can be selected according to the number of passengers.

Thus, in a so-called "solo" mode shown in FIG. 4a, it is possible to isolate each passenger by deploying all the central and transverse partitions 37 and 43.

Figure 4B:
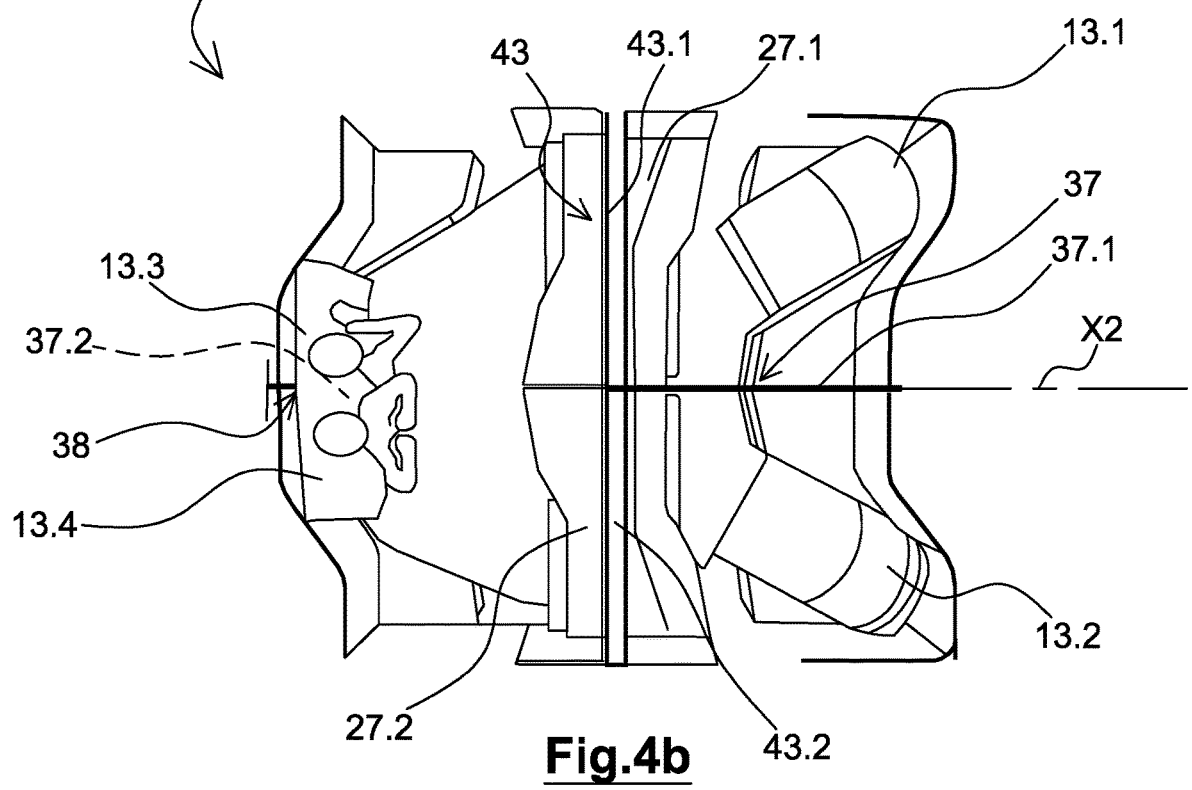

In a so-called "double" mode shown in FIG. 4b, it is possible to link two passengers placed side by side in an inverted chevron seating configuration by retracting the part 37.2 of the central partition 37.

Figure 4C:
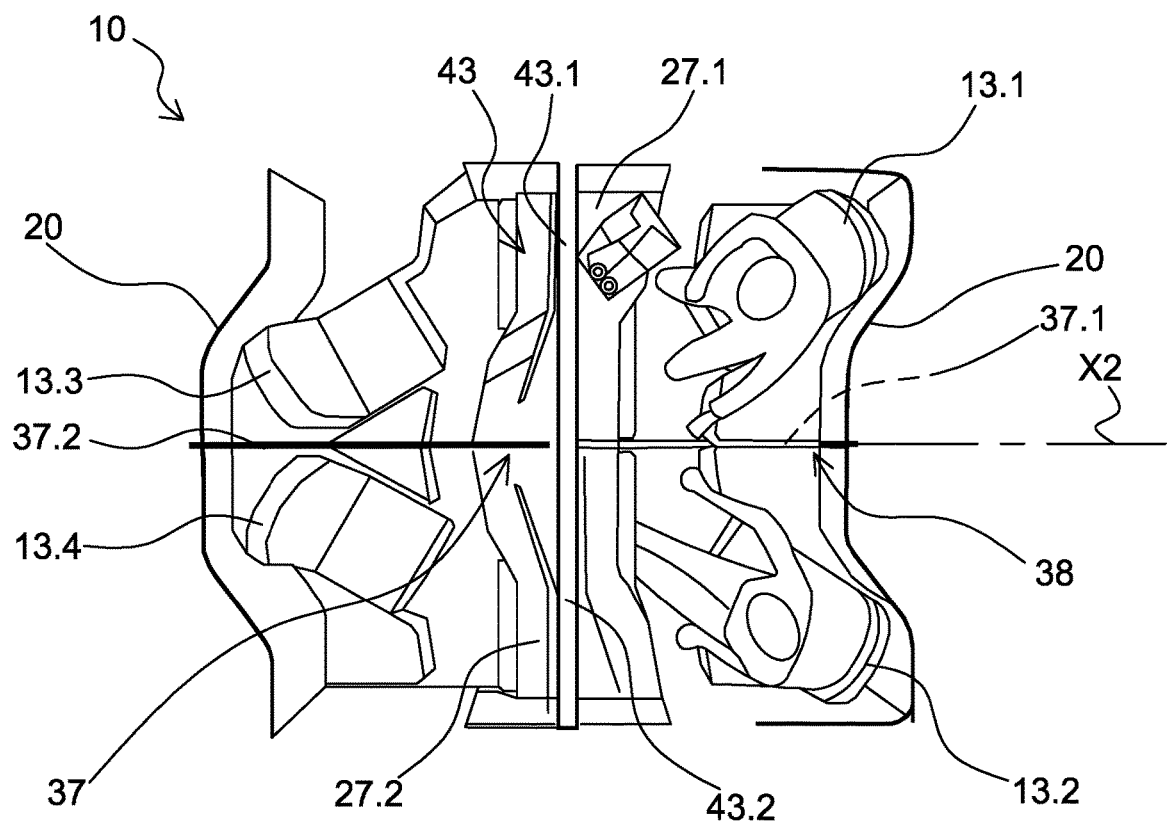

In a "pair" mode shown in FIG. 4c, two passengers can be linked side by side in a configuration of chevron seats by retracting the other part 37.1 of the central partition 37.

Figure 4D:
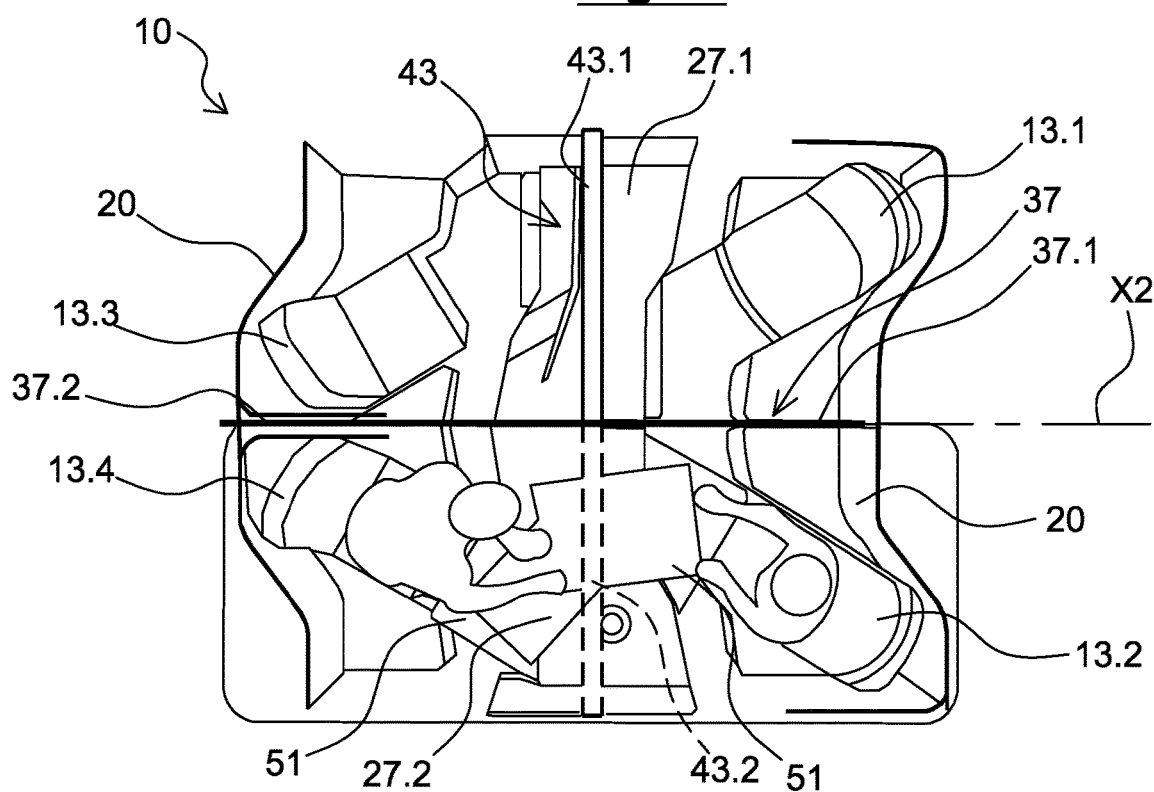

In a so-called "twin" mode shown in FIG. 4d, it is possible to link two passengers facing each other by retracting a part 43.2 of the transverse partition 43.

Figure 4E:
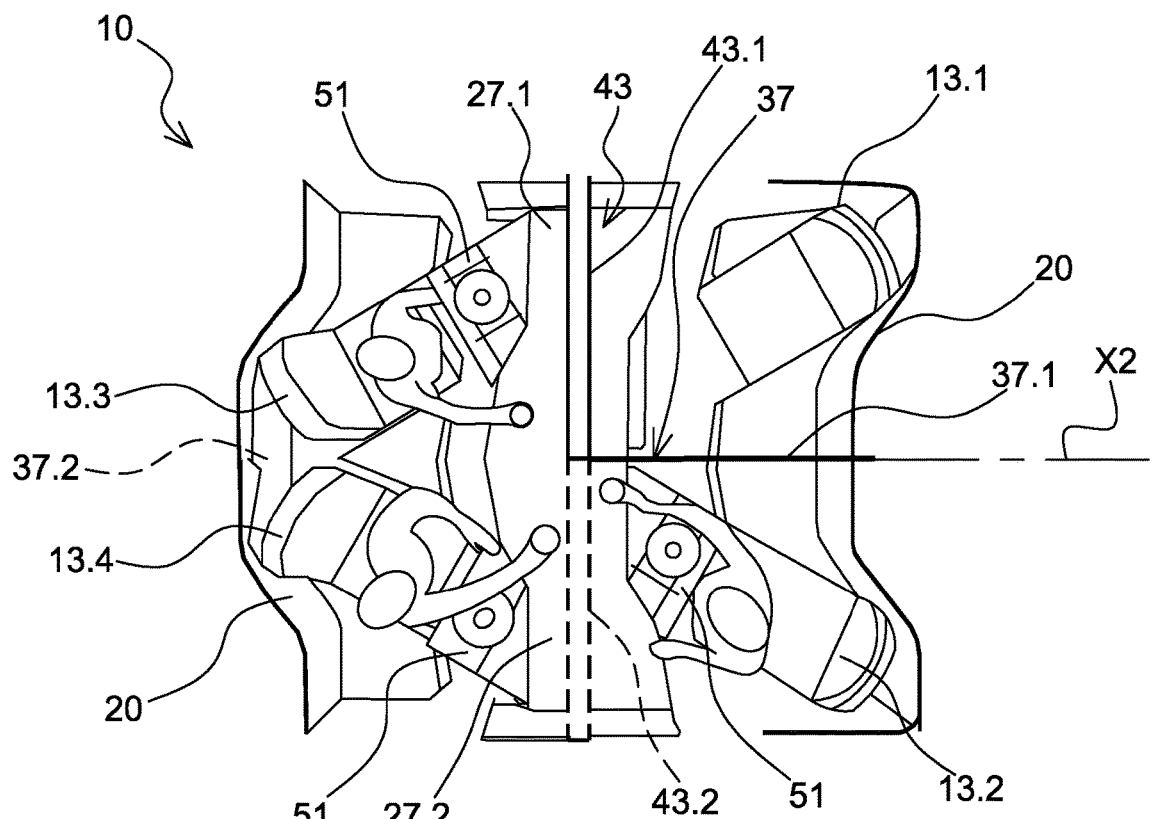

In a so-called "trio" mode shown in FIG. 4e, it is possible to link three passengers by retracting the part 43.2 of the transverse partition 43 as well as the part 37.2 of the central partition 37.

Figure 4F:
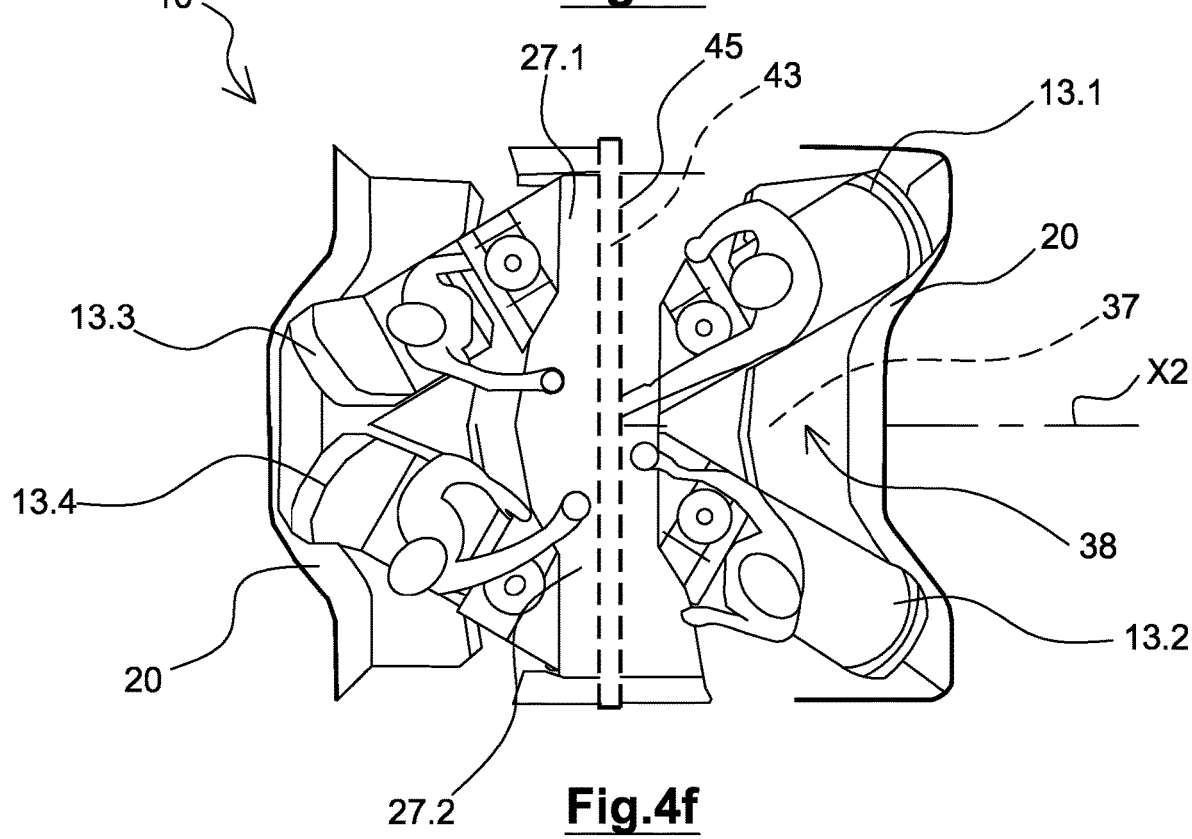

In a so-called "quad" mode shown in FIG. 4f, it is possible to link the four passengers of the arrangement by completely retracting the central partition 37 as well as the transverse partition 43.

As previously indicated, it is possible to use the screens 44 carried by the transverse partition 43. This corresponds to the cinema embodiment of FIGS. 1a to 1d.

Alternatively, in the "office" embodiment of FIGS. 3a to 3g, supports 48 carrying screens 44 are provided. Each support 48 is rotatably mounted relative to a corresponding mast 40 and the screen 44 is rotatably mounted relative to the support 48.

In order to change from a stored position of the screen 44 to a use position, it suffices to turn the support 48 towards the corresponding seat 13.1-13.4 as shown in FIG. 3c, then to rotate the screen 44 on its support 48 to orient the screen 44 in the desired direction. Inverse operations allow the screen 44 to be moved from the use position to the stored position in which the screen 44 extends in a plane substantially parallel to the partition 37, as shown in FIG. 3e.

Figure 3G:
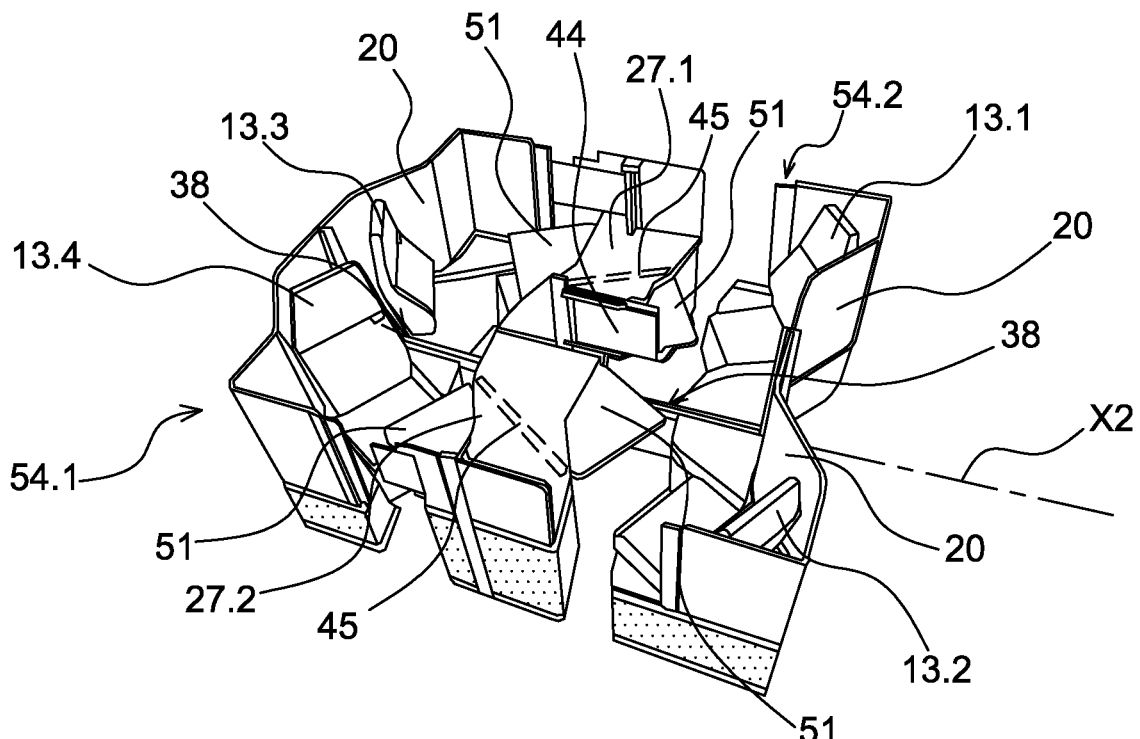

It will also be possible to provide shelves 51, each of which is associated with a seat 13.1-13.4. Each shelf 51 is movable relative to a corresponding central console 27.1-27.2 between a use position in which the shelf 51 protrudes from the console 27.1, 27.2 while located in the extension of the upper face 28 of the 27.1 console, 27.2 corresponding, as shown in FIG. 3g, and a stowed position in which the shelf 51 is stored in an inner housing of the corresponding central console 27.1, 27.2, as shown in FIG. 3f.

As can be seen, in particular in FIGS. 1b and 3b, the arrangement 10 has two lateral partitions 54.1, 54.2 each extending along an aisle. Each lateral partition 54.1, 54.2 has a means of closing 55 a passage 56 between the seat 13.1-13.4 and the corresponding central console 27.1, 27.2. The means of closing 55 may, for example, consist of a door mounted in such a way that it can move between two sections of the partition 54.1, 54.2 or a rotatably mounted door around a hinge. Advantageously, the lateral partitions 54.1, 54.2 are carried by corresponding masts 40.

It follows from the foregoing that, in order to switch from the "cinema" configuration of FIGS. 1a to 1d to the "office" configuration of FIGS. 3a to 3g, the basic modules 15, the central consoles 27.1, 27.2 and the hulls 20 have been retained and only the upper parts of the arrangement 10 (central partition 37, transverse partition 43, screen supports 48) have been modified to adapt the arrangement 10 to the specificities of the configuration imposed by the airline. There is thus a high degree of modularity in the design of seating configurations which are obtained from elementary common elements (basic modules 15, central consoles 27.1, 27.2, and hulls 20).

FIGS. 5a to 5j show different aeroplane cabin configurations 59 that can be realized. These configurations are formed by a central group of seats 61 and two lateral groups of seats 62 located on either side of the central group 61.

In this case, the two lateral groups of seats 62 are close to the walls of the aeroplane 64.

The central group 61 is separated from each of the lateral groups 62 by an aisle 63.

In the embodiment of FIG. 5a, cabin 59 has 28 passenger seats. The central group 61 comprises a repetition of the arrangement 10 with four seats 13.1-13.4 according to the invention. At its ends, the central group 61 comprises two end assemblies 65 in which the seats 13 are turned outwardly from the axis X3 of the cabin 59 (termed an "inverted chevron" or "reverse herringbone" arrangement in English).

The lateral groups 62 are formed in particular by a repetition of modules with two seats 13.1 and 13.3 (respectively 13.2 and 13.4) associated with a central console 27.1 (respectively 27.2), which corresponds to a repetition of a half-arrangement 10.

The embodiment of FIG. 5b is similar to that of FIG. 5a except that the end assemblies 65 have seats 13 turned inwardly towards the axis X1 ("chevron" or "herringbone" arrangement in English).

Figure 5C:
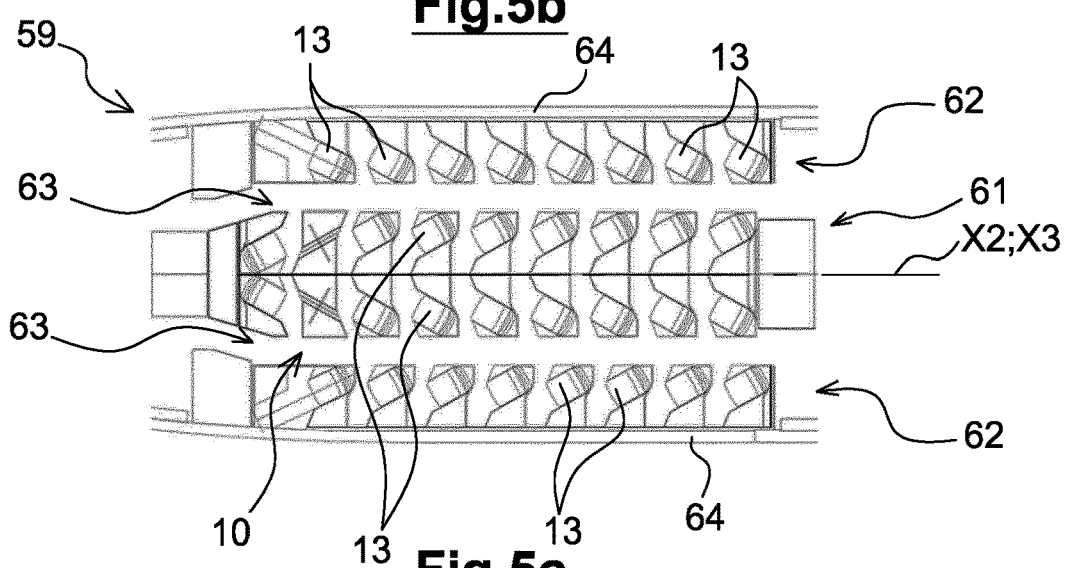

In the embodiment of FIG. 5c, the central group 61 begins with a four-seat arrangement 13.1-13.4 according to the invention and continues with chevron arrangements, which saves space by avoiding having to implement a module 66 incorporating the foot areas as was the case for the two previous configurations of FIGS. 5a and 5b. Furthermore, the lateral groups 62 are each formed by a column of seats 13 facing the partition 64 along which extends said column.

Figure 5D:
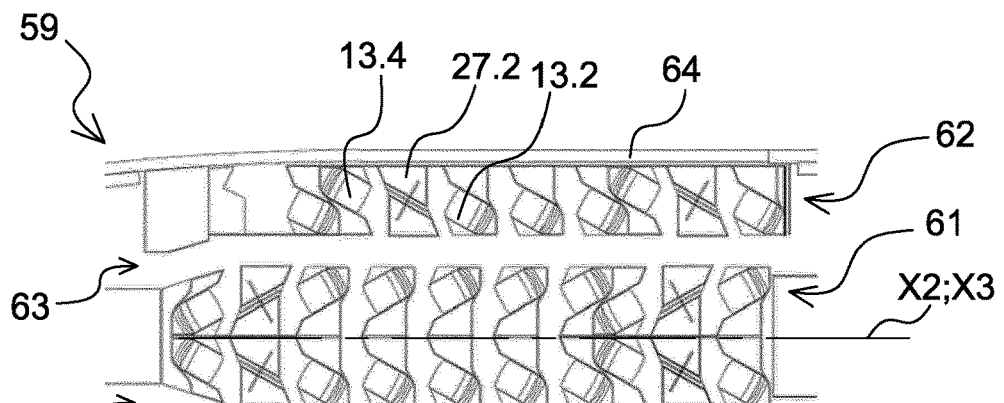

In the embodiment of FIG. 5d with 30 places, the arrangements 10 of four seats 13.1-13.4 are located at the beginning as well as at the end of the central group of seats 61. The lateral groups 62 comprise sets of two seats 13.1 and 13.3 (respectively 13.2 and 13.4) associated with a central console 27.1 (respectively 27.2).

Figure 5E:
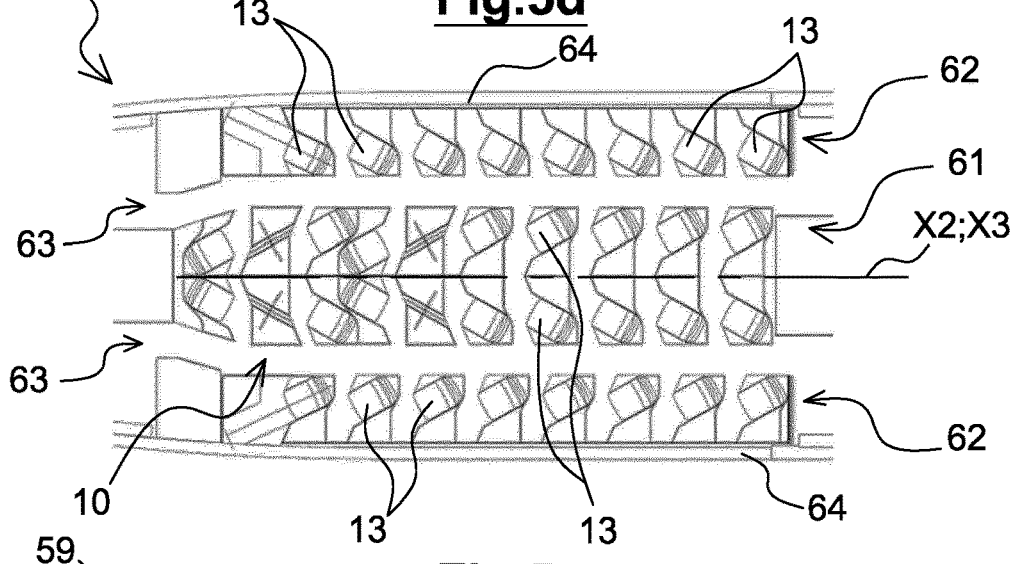

In the embodiment of FIG. 5e with 32 places, the arrangement 10 of four seats 13.1-13.4 is repeated twice at the beginning of the central group 61.

The lateral groups 62 are each formed by a column of seats 13 facing the partition 64 along which said column extends.

Figure 5F:
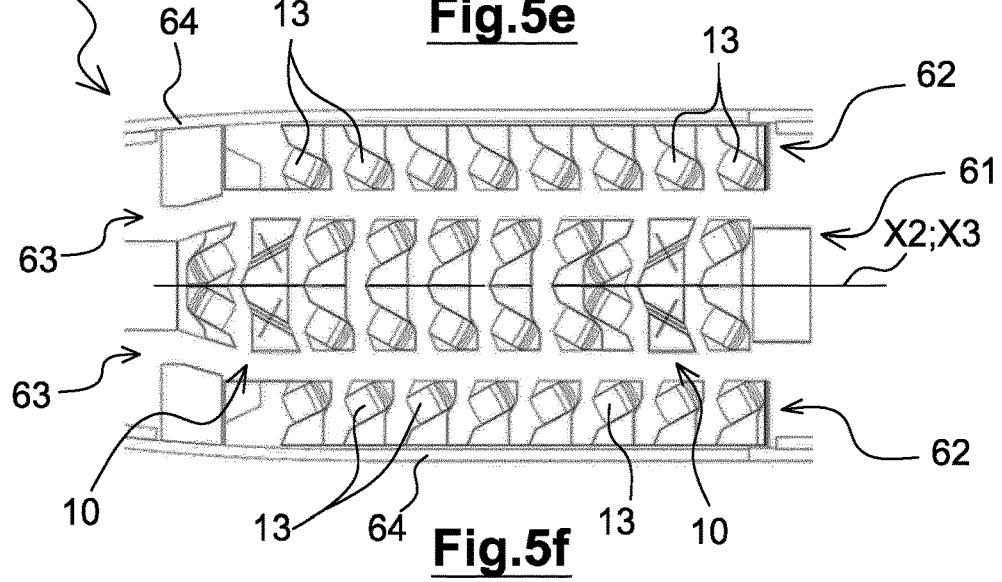

The embodiment of FIG. 5f is similar to that of FIG. 5e, except that the arrangements 10 of four seats 13.1-13.4 are located at the beginning and at the end of the central group 61.

Figure 5G:
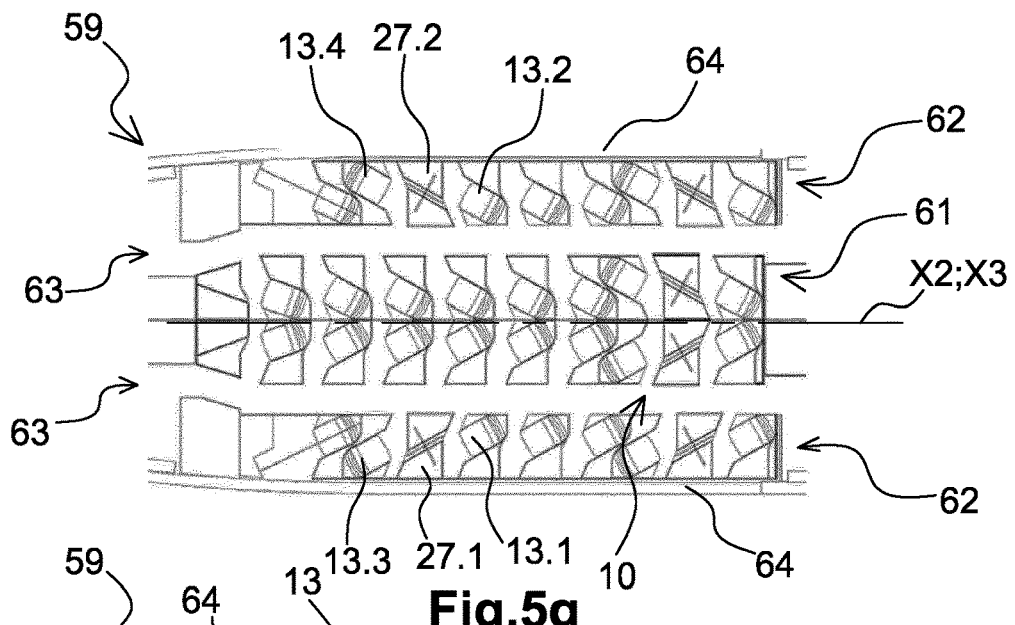

In the embodiment of FIG. 5g with 30 places, the arrangement 10 of four seats 13.1-13.4 is located at the end of the central group 61, the rest of the seats 13 having an inverted chevron configuration. The lateral groups 62 comprise sets of two seats 13.1 and 13.3 (respectively 13.2 and 13.4) associated with a central console 27.1 (respectively 27.2).

Figure 5H:
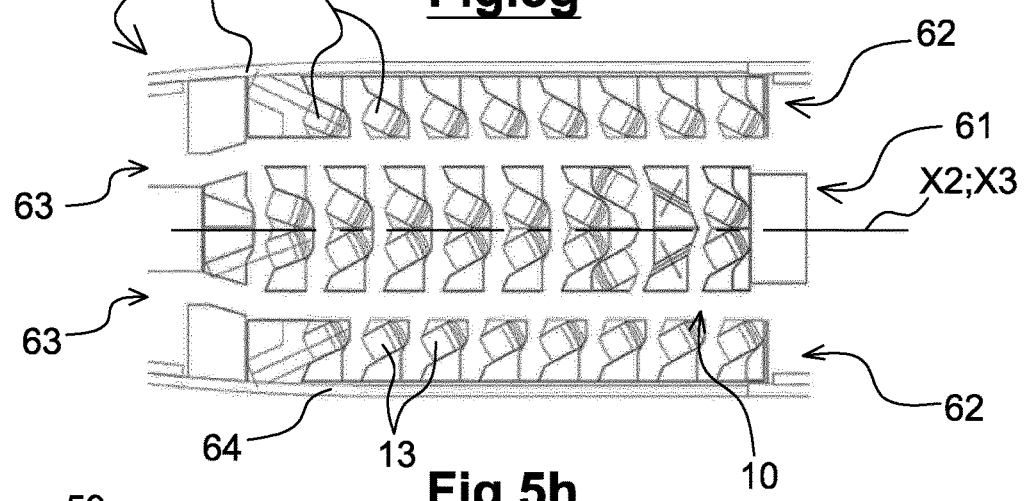

In the embodiment of FIG. 5h with 32 places, the arrangement 10 of four seats 13.1-13.4 is located at the end of the central group 61, the rest of the seats 13 having an inverted chevron configuration. The lateral groups 62 are formed by chevron-shaped seats 13 with different angles of inclination.

Figure 5I:
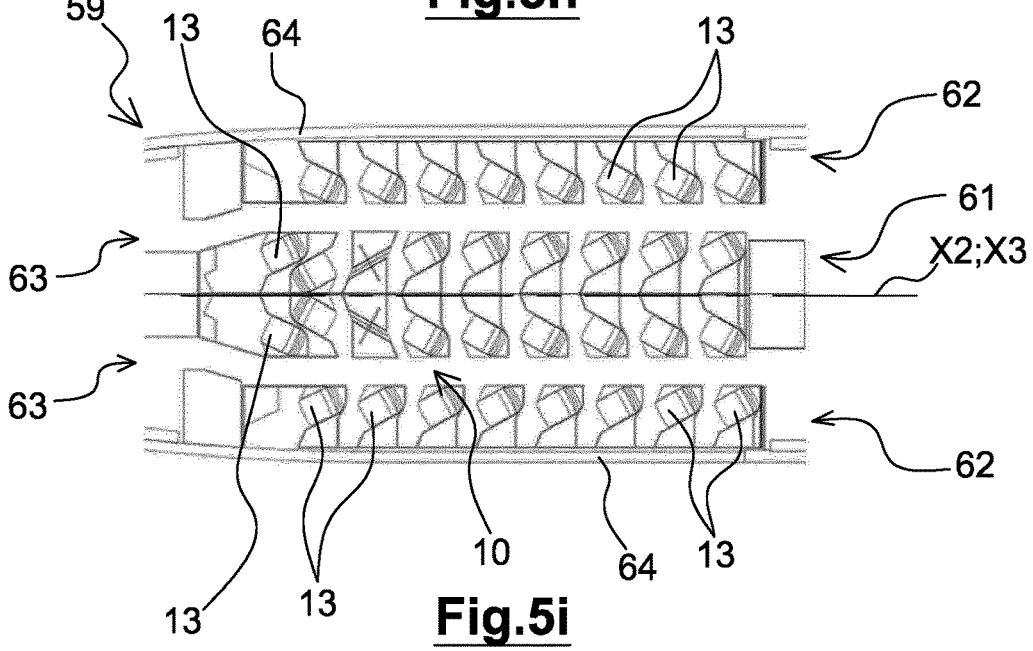

In the embodiment of FIG. 5i with 32 places, the arrangement 10 of four seats 13.1-13.4 is located in the central group 61 behind a set of seats 13 configured in a chevron. The lateral groups 62 are each formed by a column of seats 13 facing the partition 64 along which said column extends.

Figure 5J:
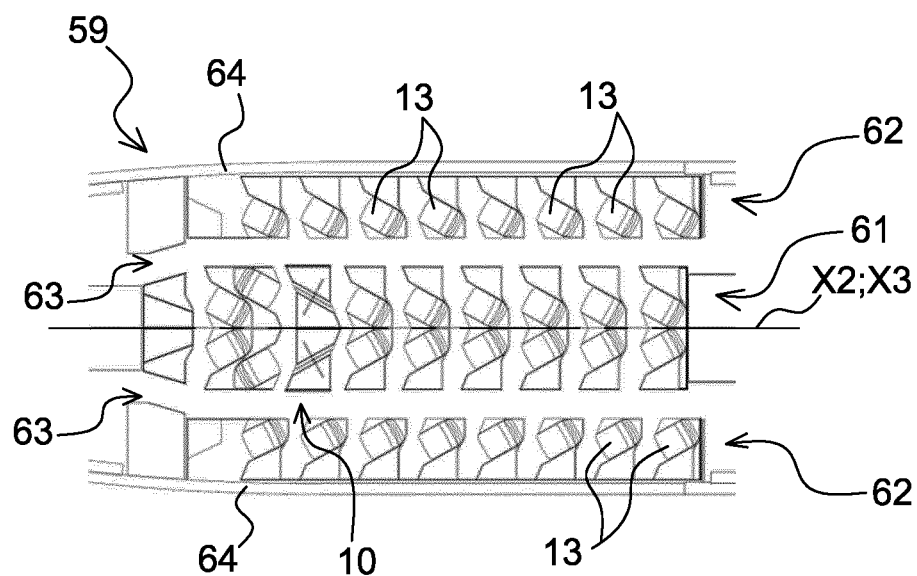

In the embodiment of FIG. 5j with 32 places, the arrangement 10 of four seats 13.1-13.4 is located in the central group 61 behind a set of seats 13 configured in an inverted chevron. The lateral groups 62 are each formed by a column of seats 13 facing the partition 64 along which said column extends.

The invention may also be implemented with seats installed in other means of transport, such as seats for buses, trains, or boats.

Of course, the invention is not limited to the embodiments described above which are provided solely by way of example. It encompasses various modifications, alternative forms and other variants that may be considered by those skilled in the art in the context of the present invention, and in particular any combination of the different modes of operation described above, which can be taken separately or in combination.

The invention claimed is:

1. A plurality of arrangements of individual seats for installation in an aeroplane cabin, each arrangement having a first assembly of two seats and a second assembly of two seats, each seat having an axis and being convertible between a sitting position and an extended position, each arrangement having a longitudinal axis, wherein for each arrangement:
   a first seat of the first assembly and a first seat of the second assembly face each other,
   a second seat of the first assembly and a second seat of the second assembly face each other,
   the first seat and the second seat of the first assembly are turned inwardly towards the longitudinal axis of the arrangement,
   the first seat and the second seat of the second assembly are turned outwardly with respect to the longitudinal axis of the arrangement, wherein each arrangement further comprises:
   a first central console and a second central console are positioned between the first assembly and the second assembly,
   the first central console comprising a first foot area and a second foot area, wherein the first foot area and the second foot area are open in two opposite directions relative to each other and respectively associated with the first seat of the first assembly and the first seat of the second assembly,
   the second central console comprising a first foot area, and a second foot area, wherein the first foot area and the second foot area are open in two opposite directions relative to each other and respectively associated with the second seat of the first assembly and the second seat of the second assembly,
   a transverse partition extending in a direction perpendicular to the longitudinal axis of each arrangement to selectively isolate the first assembly from the second assembly,
   the first central console and the second central console each having a flat upper surface on which a passenger can place objects, and
   the transverse partition being constructed in two parts which are each retractable between an extended position and a stowed position,
   so that:
   in a first configuration, one of the two parts of the transverse partition is retracted, and
   in a second configuration, both parts of the transverse partition are retracted,
   the arrangement further comprising:
   a central partition extending along the longitudinal axis to separate the seats of the same assembly, and
   masts extending vertically relative to the flat upper surface of the first central console and the flat upper surface of the second central console, wherein said central partition is mechanically connected to the masts, wherein the masts are hollow to allow passage of wiring harnesses, wherein the masts include slides to allow a displacement of the central partition in a vertical direction, and wherein at least one of masts is adjacent and between the flat upper surface of the first central console and the flat upper surface of the second central console.

2. The arrangement of claim 1, wherein the central partition is retractable between an extended position and a stored position.

3. The arrangement of claim 2, wherein, in the stowed position, the central partition is housed at least partially in a space between the first central console and the second central console.

4. The arrangement of claim 2, wherein the central partition is constructed in one part.

5. The arrangement of claim 2, wherein the central partition is constructed in two parts to isolate the seats at a side of the two assemblies.

6. The arrangement of claim 2, wherein said central partition is mechanically connected to masts of the arrangement.

7. The arrangement of claim 1, wherein the two parts of the transverse partition are independently movable between the extended position and the stowed position, allowing for independent separation the first seats of each assembly or the second seats of each assembly.

8. The arrangement of claim 7, wherein, in the stowed position, each part of the transverse partition is housed at least partially in a space formed in a corresponding central console.

9. The arrangement of claim 1, wherein the transverse partition carries screens, each of which is associated with a seat of said arrangement.

10. The arrangement of claim 1, further comprising at least one support carrying a screen, said support being rotatably mounted relative to a mast and said screen being rotatably mounted relative to said support.

11. The arrangement of claim 1, further comprising at least one lateral partition extending along an aisle, said lateral partition having means for closing a passage between the seat and the corresponding central console.

12. The arrangement of claim 11, wherein the lateral partition is carried by masts.

13. The arrangement of claim 12, wherein the masts are hollow to allow the passage of wiring harnesses carrying power and data signals for multimedia systems associated with the seats.

14. The arrangement of claim 1, wherein each seat is associated with a hull positioned around seat backs.

15. An aeroplane cabin comprising:
   a central group of seats;
   two lateral groups of seats located on either side of the central group of seats; and
   each lateral group of seats being separated from the central group by an aisle,
      wherein the central group comprises the plurality of arrangements of four seats as defined in claim 1.

16. The aeroplane cabin of claim 15, wherein at least one arrangement of four seats is located at one end of the central seat group.

17. The aeroplane cabin of claim 15, wherein the lateral groups are formed in particular by a repetition of modules of two seats associated with a central console.

18. A plurality of arrangements of individual seats for installation in an aeroplane cabin, each arrangement having a first assembly of two seats and a second assembly of two seats, each sea t having an axis and being convertible between a sitting position and an extended position, each arrangement having a longitudinal axis,
   wherein for each arrangement:
      a first seat of the first assembly and a first seat of the second assembly face each other,
      a second seat of the first assembly and a second seat of the second assembly face each other, the first seat and the second seat of the first assembly are turned inwardly towards the longitudinal axis of the arrangement, the first seat and the second seat of the second assembly are turned outwardly with respect to the longitudinal axis of the arrangement, wherein each arrangement further comprises:

a first central console and a second central console are positioned between the first assembly and the second assembly, the first central console comprising an upper surface, a first foot area, and a second foot area, wherein the first foot area and the second foot area are open in two opposite directions relative to each other and respectively associated with the first seat of the first assembly and the first seat of the second assembly, the second central console comprising an upper surface, a first foot area, and a second foot area, wherein the first foot area and the second foot area are open in two opposite directions relative to each other and respectively associated with the second seat of the first assembly and the second seat of the second assembly, a transverse partition extending in a direction perpendicular to the longitudinal axis of each arrangement to selectively isolate the first assembly from the second assembly, and the transverse partition being constructed in two parts which are each retractable between an extended position and a stowed position, so that:

in a first configuration, one of the two parts of the transverse partition is retracted, and in a second configuration, both parts of the transverse partition are retracted, wherein at least one of the first central console or the second central console comprises a storage space extending below the upper surface of the first central console or the second central console, wherein the storage space is configured to receive one of the two parts of the transverse partition through the upper surface such that the one of the two parts of the transverse partition is retracted into the storage space, the arrangement further comprising:

a central partition extending along the longitudinal axis to separate the seats of the same assembly, and masts extending vertically relative to the upper surface of the first central console and the upper surface of the second central console, wherein said central partition is mechanically connected to the masts, wherein the masts are hollow to allow passage of wiring harnesses, wherein the masts include slides to allow a displacement of the central partition in a vertical direction, and wherein at least one of masts is adjacent and between the flat upper surface of the first central console and the flat upper surface of the second central console.

19. The arrangement of claim 18, wherein the storage space is inclined relative to the longitudinal axis of the arrangement and a lateral axis of the arrangement.

20. A plurality of arrangements of individual seats for installation in an aeroplane cabin, each arrangement having a first assembly of two seats and a second assembly of two seats, each seat having an axis and being convertible between a sitting position and an extended position, each arrangement having a longitudinal axis, wherein for each arrangement:

a first seat of the first assembly and a first seat of the second assembly face each other, a second seat of the first assembly and a second seat of the second assembly face each other, the first seat and the second seat of the first assembly are turned inwardly towards the longitudinal axis of the arrangement, the first seat and the second seat of the second assembly are turned outwardly with respect to the longitudinal axis of the arrangement, wherein, an armrest is between the first seat and the second seat of the first assembly or between the first seat and the second seat of the second assembly, and wherein the armrest is retractable between a raised position and a lowered position, wherein, in the raised position, the armrest is above a seat base of the first seat, and wherein, in the lowered position, the armrest forms an extension of the seat base of the first seat, wherein each arrangement further comprises:

a first central console and a second central console are positioned between the first assembly and the second assembly, the first central console comprising an upper surface, a first foot area, and a second foot area, wherein the first foot area and the second foot area are open in two opposite directions relative to each other and respectively associated with the first seat of the first assembly and the first seat of the second assembly, the second central console comprising an upper surface, a first foot area, and a second foot area, wherein the first foot area and the second foot area are open in two opposite directions relative to each other and respectively associated with the second seat of the first assembly and the second seat of the second assembly, a transverse partition extending in a direction perpendicular to the longitudinal axis of each arrangement to selectively isolate the first assembly from the second assembly, and the transverse partition being constructed in two parts which are each retractable between an extended position and a stowed position, so that:

in a first configuration, one of the two parts of the transverse partition is retracted, and in a second configuration, both parts of the transverse partition are retracted, wherein at least one of the first central console or the second central console comprises a storage space extending below the upper surface of the first central console or the second central console, wherein the storage space is configured to receive one of the two parts of the transverse partition through the upper surface such that the one of the two parts of the transverse partition is retracted into the storage space, the arrangement further comprising:

a central partition extending along the longitudinal axis to separate the seats of the same assembly, and masts extending vertically relative to the upper surface of the first central console and the upper surface of the second central console, wherein said central partition is mechanically connected to the masts, wherein the masts are hollow to allow passage of wiring harnesses, wherein the masts include slides to allow a displacement of the central partition in a vertical direction, and wherein at least one of masts is adjacent and between the upper surface of the first central console and the upper surface of the second central console.

* * * * *